United States Patent
Yamaguchi et al.

(10) Patent No.: US 6,755,635 B2
(45) Date of Patent: Jun. 29, 2004

(54) APPARATUS FOR PROTECTING MOLD IN INJECTION MOLDING MACHINE

(75) Inventors: Yutaka Yamaguchi, Shizuoka-ken (JP); Masamitsu Suzuki, Numazu (JP); Takahiro Furuno, Gamagori (JP); Makoto Nishizawa, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 125 days.

(21) Appl. No.: 09/908,541

(22) Filed: Jul. 20, 2001

(65) Prior Publication Data

US 2002/0028262 A1 Mar. 7, 2002

(30) Foreign Application Priority Data

Jul. 28, 2000 (JP) ...................................... 2000-229210

(51) Int. Cl.⁷ .............................................. B29C 45/08
(52) U.S. Cl. ..................... 425/136; 425/150; 264/40.1; 264/40.5
(58) Field of Search .............................. 264/40.1, 40.5; 425/150, 136

(56) References Cited

U.S. PATENT DOCUMENTS

| | | | |
|---|---|---|---|
| 4,710,119 A | * 12/1987 | Otake | ......................... 425/136 |
| 4,726,920 A | 2/1988 | Yokota | |
| 5,059,365 A | 10/1991 | Hertzer et al. | |
| 5,149,471 A | * 9/1992 | Catanzaro et al. | ......... 264/40.5 |
| 5,161,594 A | 11/1992 | Bolton et al. | |
| 5,770,808 A | * 6/1998 | Yokoyama | .................. 73/865.9 |
| 5,800,750 A | * 9/1998 | Laing et al. | ............... 264/40.5 |
| 5,906,777 A | * 5/1999 | Kamiguchi et al. | ........ 264/40.1 |
| 6,402,998 B1 | * 6/2002 | Onishi | ....................... 264/40.5 |
| 6,409,495 B1 | * 6/2002 | Kamiguchi et al. | ......... 425/150 |
| 2002/0028262 A1 | 3/2002 | Yamaguchi et al. | |

FOREIGN PATENT DOCUMENTS

| | | |
|---|---|---|
| CH | 638 702 A5 | 10/1983 |
| DE | 42 32 179 A 1 | 12/1993 |
| DE | 196 32 475 C2 | 10/1997 |
| EP | 1 013 400 A2 | 6/2000 |
| EP | 1 072 388 A2 | 1/2001 |
| JP | 59-191558 | 10/1984 |
| JP | 61-71164 | 4/1986 |
| JP | 61-255755 | 11/1986 |
| JP | 64-5654 | 1/1989 |
| JP | 3-90267 | 4/1991 |
| JP | 3-155445 | 7/1991 |
| JP | 3-254351 | 11/1991 |
| JP | 9-254218 | 9/1997 |
| JP | 10-15653 | 1/1998 |
| JP | 10-58113 | 3/1998 |
| JP | 2001-62884 | 3/2001 |

* cited by examiner

Primary Examiner—Michael Colaianni
Assistant Examiner—Monica Fontaine
(74) Attorney, Agent, or Firm—Pillsbury Winthrop, LLP

(57) ABSTRACT

There is disclosed a mold protection apparatus of an injection molding machine in which a cross head position and movable mold position are read from a correspondence table, a calculator calculates a thrust force limit value set with respect to a movable mold, and a cross head position controller controls a thrust force of the cross head in the corresponding position via a servomotor, so that the thrust force of the cross head is controlled to indicate a limit value or less in accordance with position of the movable mold.

5 Claims, 5 Drawing Sheets

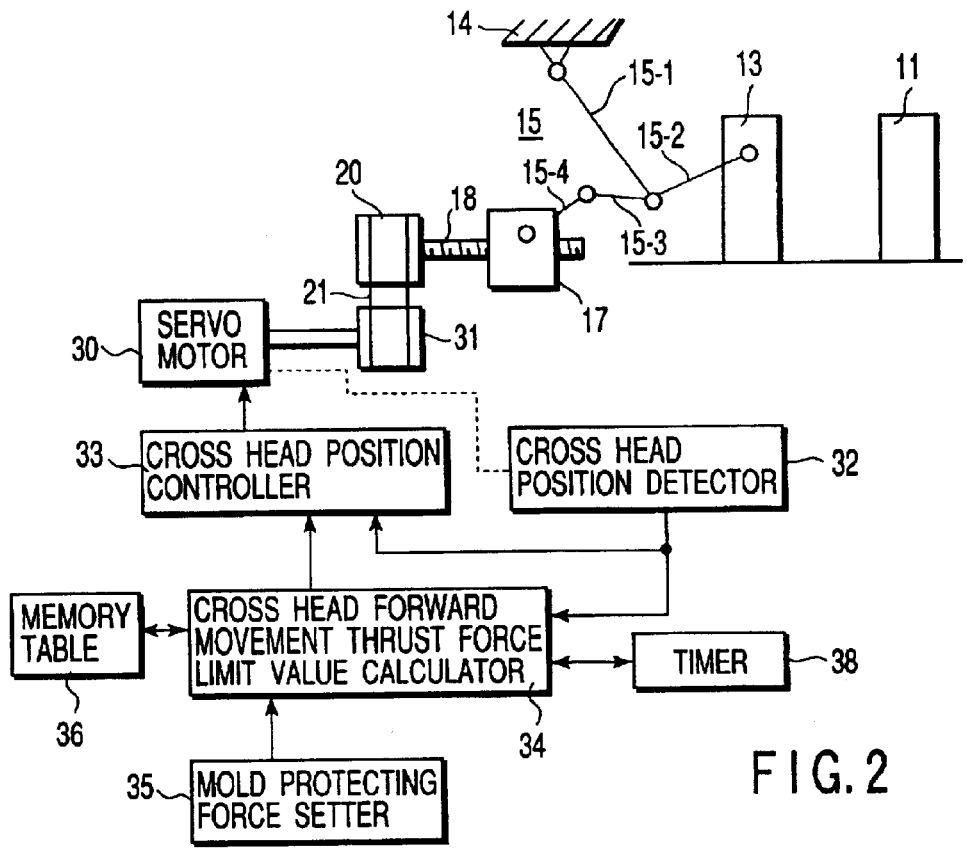
FIG. 2
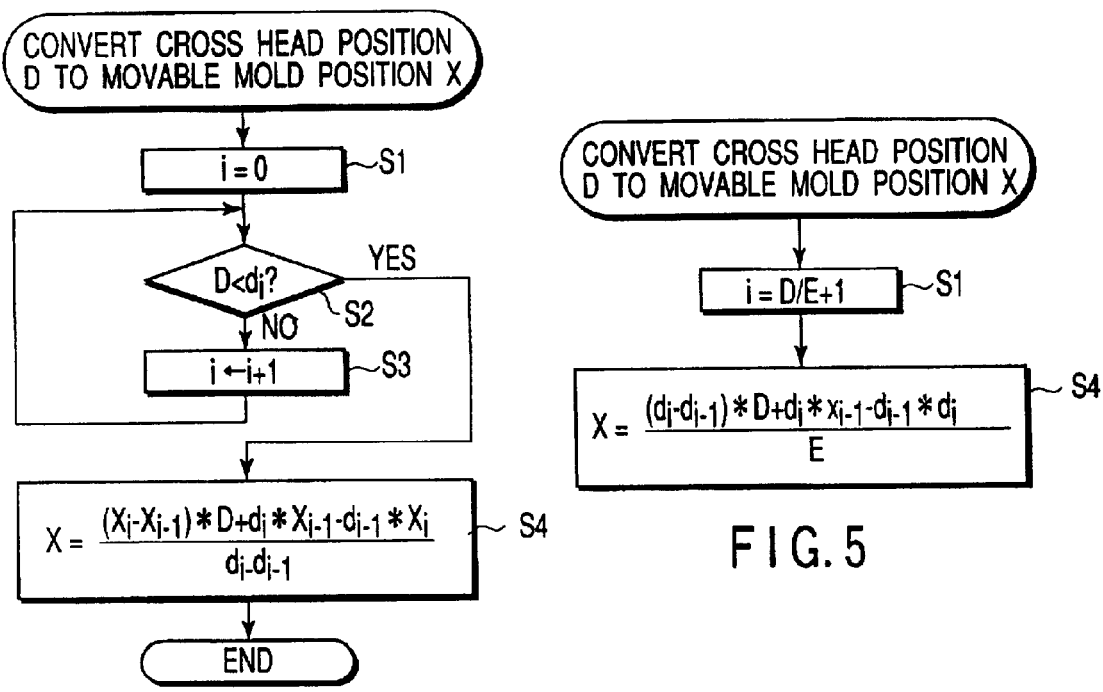
FIG. 4
FIG. 5

| MEMORY TABLE ||
| --- | --- |
| EQUAL-INTERVAL CROSS HEAD POSITION (mm) | MOVABLE MOLD POSITION (mm) |
| $d_0=0$ | $X_0=0$ |
| $d_1=8$ | $X_1=0.002$ |
| $d_2=16$ | $X_2=0.021$ |
| $d_3=24$ | $X_3=0.089$ |
| $d_4=32$ | $X_4=0.256$ |
| $d_5=40$ | $X_5=0.584$ |
| $d_6=48$ | $X_6=1.15$ |
| $d_7=56$ | $X_7=2.041$ |
| $d_8=64$ | $X_8=3.36$ |
| $d_9=72$ | $X_9=5.214$ |
| $d_{10}=80$ | $X_{10}=7.716$ |
| $d_{11}=88$ | $X_{11}=10.986$ |
| $d_{12}=96$ | $X_{12}=15.128$ |
| $d_{13}=104$ | $X_{13}=20.214$ |
| $d_{14}=112$ | $X_{14}=26.399$ |
| $d_{15}=120$ | $X_{15}=33.65$ |
| $d_{16}=128$ | $X_{16}=42.006$ |
| $d_{17}=136$ | $X_{17}=51.441$ |
| $d_{18}=144$ | $X_{18}=61.887$ |
| $d_{19}=152$ | $X_{19}=73.242$ |
| $d_{20}=160$ | $X_{20}=85.371$ |
| $d_{21}=168$ | $X_{21}=98.122$ |
| $d_{22}=176$ | $X_{22}=111.331$ |
| $d_{23}=184$ | $X_{23}=124.835$ |
| $d_{24}=192$ | $X_{24}=138.486$ |
| $d_{25}=200$ | $X_{25}=152.151$ |
| $d_{26}=208$ | $X_{26}=165.719$ |
| $d_{27}=216$ | $X_{27}=179.103$ |
| $d_{28}=224$ | $X_{28}=192.236$ |
| $d_{29}=232$ | $X_{29}=205.072$ |
| $d_{n-2}=328$ | $X_{n-2}=334.625$ |
| $d_{n-1}=336$ | $X_{n-1}=343.971$ |
| $d_n=344$ | $X_n=353.293$ |

FIG. 3

APPARATUS FOR PROTECTING MOLD IN INJECTION MOLDING MACHINE

CROSS-REFERENCE TO RELATED APPLICATIONS

This application is based upon and claims the benefit of priority from the prior Japanese Patent Application No. 2000-229210, filed on Jul. 28, 2000, the entire contents of which are incorporated by reference.

BACKGROUND OF THE INVENTION

1. Field of the Invention

The present invention relates to a driving force control of a movable mold during a mold closing operation in an injection molding machine such as an electrically driven injection molding machine, particularly to an apparatus for protecting a mold in an injection molding machine including a toggle or another similar link mechanism for the mold closing operation and subsequent mold clamping operation.

2. Description of the Related Art

When a rigid foreign substance such as a small piece of a molding material is erroneously held between a movable mold and a fixed mold during a mold closing operation of an electrically driven injection molding machine, an irregular force is added to these molds. As a result, the molds will accidentally be broken, danger will be extended to an operator near the machine, and it is therefore important to control a driving force with respect to the movable mold. It is inherently necessary to directly set the driving force with respect to the movable mold, but the movable mold is not directly driven by a servomotor in the injection molding machine. A cross head connected to the servomotor via a link mechanism is driven for driving the movable mold to close the molds. Therefore, it is necessary to control the driving force of the movable mold as a control of the driving force of the cross head.

Particularly, when the movable mold is connected to the cross head via a complicated link mechanism such as a toggle mechanism, a very complicated calculation is required in estimating and controlling a thrust force to be supplied to the movable mold from the thrust force applied to the cross head, and a time consuming calculation processing is also required.

A conventional mold protection apparatus for use in closing the molds in the injection molding machine including the toggle mechanism is disclosed in Jpn. Pat. Appln. KOKAI Publication No. 9-254218. In this disclosed prior art, a strain sensor for detecting a strain amount is disposed in any constituting member of the toggle mechanism and molds, the thrust force is estimated from the strain amount and limited in order to protect the molds by controlling the movement of the movable mold. However, since the strain sensor and the like are used in this system, a constitution becomes complicated and expensive.

Therefore, an object of the present invention is to provide an apparatus for protecting molds in an injection molding machine, in which the calculation for obtaining a movable mold thrust force from a cross head thrust force is simplified, the movable mold thrust force in a mold protection area during a mold closing operation is set to a value smaller than a mold protecting force when a cross head is moved forward, so that a driving force control is facilitated for a mold clamping operation, and a mold injection processing can be quickened.

BRIEF SUMMARY OF THE INVENTION

According to one aspect of the present invention, there is provided an apparatus for protecting molds in an injection molding machine, comprising: a cross head; a driving apparatus for driving the cross head; a movable mold connected to the cross head via a link mechanism; and a controller for controlling a forward thrust force of the movable mold when the movable mold is brought into contact with a fixed mold to close the molds. The controller comprises a memory table in which a correspondence table showing a relation between a cross head position and a movable mold position is stored beforehand; and a driving unit which drives the cross head so that the movable mold moves with a thrust force preset to a mold protecting force or less in accordance with the position of the movable mold in a mold protection area using the memory table.

Moreover, a limit value of a minus thrust force on a backward side during deceleration of the cross head during mold closing until the movable mold contacts the fixed mold is set to a maximum driving force of the cross head.

With the constitution, the memory table with the correspondence table denoting a relation between the cross head position and movable mold position stored beforehand therein is used to limit the driving force applied to the movable mold in the mold protection area during a forward moving operation of the movable mold in accordance with a predetermined magnified force ratio transmitted to the movable mold from the cross head via the link mechanism. Thereby, the thrust force calculation is simplified, and the molds can easily be protected during a mold clamping operation while the movable mold is driven at a high speed.

Moreover, even when the movable mold is moved at a high speed, the speed can effectively be reduced with respect to a mold clamping position, an inertial force of the movable mold can sufficiently be controlled, and the mold protection operation can easily be performed at a high speed during the mold clamping operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 2 is a block diagram showing a whole constitution of the embodiment;

FIG. 3 is a diagram showing a correspondence between a movable mold position and a cross head position;

FIG. 4 is a flowchart of an operation for converting the movable mold position to the cross head position;

FIG. 5 is a flowchart of another operation for converting the movable mold position to the cross head position;

DETAILED DESCRIPTION OF THE INVENTION

A preferred embodiment of the present invention will be described hereinafter with reference to the accompanying drawings.

Figure 1:
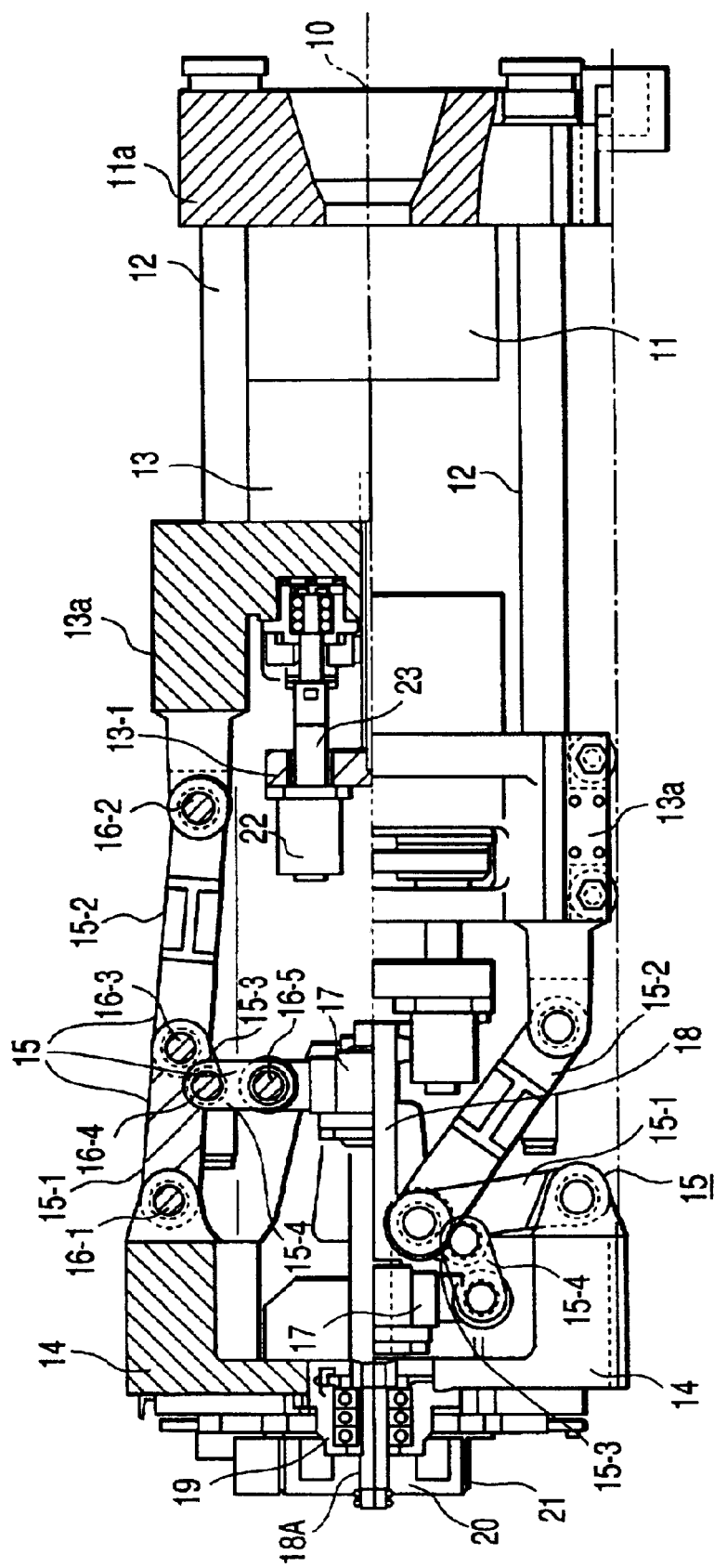
FIG. 1 is a partial sectional view showing a mechanism portion of a mold clamping apparatus according to an embodiment of the present invention.

FIG. 1 is a partially cutout side view showing a mechanism portion of one embodiment in which the present invention is applied to an electrically driven injection molding machine. A fixed mold 11 is connected to a fixed die plate 11a, and a movable mold 13 is connected to a movable die plate 13a. One end of a tie-bar 12 is fixed to the fixed die plate 11a, the tie-bar 12 is inserted into the movable die plate 13a, so that the movable mold 13 is movably held by the tie-bar 12.

The other end of the tie-bar 12 is fixed to a link housing 14, and the link housing 14 is connected to the movable die plate 13a via a link mechanism 15. In the present embodiment, the toggle mechanism 15 is used.

In FIG. 1, in order to easily understand a complicated movement of the toggle mechanism 15, the whole apparatus is shown in a sectional view in which an upper side is cut out along a central axis 10. In the upper side sectional view, the toggle mechanism 15 is extended, and in a lower-half non-sectional part of the view, the toggle mechanism 15 is folded.

The toggle mechanism 15 is constituted of four arms 15-1, 15-2, 15-3, 15-4, one end of the arm 15-1 is attached to the link housing 14 via a pin 16-1 in a pivoted manner, and one end of the arm 15-2 is attached to the movable die plate 13a via a pin 16-2 in the pivoted manner. The other ends of the arms 15-1 and 15-2 are attached to one end of the arm 15-3 via a pin 16-3 in the pivoted manner. The other end of the arm 15-3 is pivoted to one end of the arm 15-4 via a pin 16-4, and the other end of the arm 15-4 is pivoted to a link connection portion of a cross head 17 via a pin 16-5.

A screw hole is formed in the cross head 17, and a ball screw 18 for opening/closing the molds is inserted in the screw hole. One end of the ball screw 18 is fixed to one end of a rotation shaft 18A rotatably supported by a bearing 19 fixed to a central portion of the link housing 14. The other end of the rotation shaft 18A projects out of the link housing 14, and a timing belt 21 for opening/closing the molds is connected to and driven by a servomotor 30 shown in FIG. 2 via a fixed pulley 20.

A servomotor 22 fixed onto a frame 13-1 is disposed inside the movable die plate 13a, an extruding ball screw 23 is fixed to a rotation shaft of the servomotor 22, and a molded product is extruded after injection mold is completed.

For the toggle mechanism 15, as shown in the lower-half part below the central axis 10, when the movable mold 13 is separated from the fixed mold 11, the long arms 15-1, 15-2 of the toggle mechanism 15 are folded. When the servomotor 30 shown in FIG. 2 is driven from this state, the mold opening/closing ball screw 18 is rotated via the mold opening/closing timing belt 21, and the cross head 17 is moved toward the right in the drawing, that is, in a mold clamping direction.

With the movement of the cross head 17, the toggle mechanism 15 is gradually extended. As shown in the upper-half part above the central axis 10 of the mold clamping apparatus of FIG. 1, the long arms 15-1, 15-2 are brought to a straight-line state. To approach this state to a certain degree, the movable mold 13 approaches the fixed mold 11 at a high speed by a link action of the toggle mechanism 15 with respect to the movement of the cross head 17.

When the servomotor 30 is further driven from this state, the cross head 17 is also moved by rotation of the ball screw 18, but the movable mold 13 moves at a reduced speed lower than the speed of the cross head 17 by a force magnifying action of the toggle mechanism 15. When the movable mold 13 contacts the fixed mold 11 and subsequently the servomotor 30 is further driven, the short arms 15-3, 15-4 serve as a lock mechanism, the long arms 15-1, 15-2 are locked in substantially linearly aligned positions, and mold clamping is then completed.

In FIG. 1, the position and thrust force of the cross head 17 can accurately be grasped and controlled in accordance with a rotation number and driving current of the servomotor 30. However, since the complicated toggle mechanism 15 is disposed, the position and thrust force of the movable mold 13 cannot accurately or quickly be grasped or controlled. This respect is improved, and the molds can effectively be protected in the present embodiment. The present embodiment will be described hereinafter in more detail with reference to FIGS. 2 to 5.

FIG. 2 shows a whole constitution of a mold clamping apparatus having the mechanism of FIG. 1. In FIG. 2, elements corresponding to those of FIG. 1 are denoted with the same reference numerals, and detailed description thereof is omitted. Moreover, since the movable die plate 13a is fixedly coupled to the movable mold 13, the movable die plate 13a is omitted.

In FIG. 2, the timing belt 21 is extended between a pulley 31 fixed to the rotation shaft of the servomotor 30 and the pulley 20, and the rotation of the servomotor 30 is transmitted to the ball screw 18.

The rotation number of the servomotor 30 has a defined relation with the rotation number of the ball screw 18. Therefore, when the rotation number of the servomotor 30 is counted, movement position data of the cross head 17 can accurately be obtained. To this end, an encoder is disposed in the servomotor 30, and shown as a cross head position detector 32 in FIG. 2. Moreover, since the thrust force of the cross head 17 has a defined relation with a driving current for driving the servomotor 30, thrust force data of the cross head 17 can also be obtained by the driving current of the servomotor 30.

The servomotor 30 is driven by a cross head position controller 33 which operates as a motor driver controlled by a cross head forward movement thrust force limit value calculator 34. The rotation number of the servomotor 30 is constantly checked by the cross head position detector 32, and a detection output is fed back to the cross head forward movement thrust force limit value calculator 34.

The cross head forward movement thrust force limit value calculator 34 refers to a protecting force set value of the movable mold 13 transmitted from a mold protecting force setter 35 and a prepared memory table 36 to perform a predetermined calculation. An upper limit value of the thrust force in the position of the cross head 17 corresponding to the position of the movable mold 13 is transmitted to the cross head position controller 33.

In the memory table 36, data denoting the position of the movable mold 13 corresponding to the position of the cross head 17 for each unit movement distance is stored beforehand over a whole stroke (e.g., 400 mm) of the cross head 17 and movable mold 13. A content of the present embodiment comprises: referring to the memory table 36; calculating the upper limit value of the thrust force of the cross head 17 in accordance with the position of the movable mold 13 by the cross head forward movement thrust force limit value calculator 34; using the upper limit value of the thrust force as the upper limit of the driving current of the servomotor 30 to control the position of the cross head 17 by the cross head position controller 33, thereby controlling the thrust force applied to the cross head 17.

A content of position information stored in the memory table 36 for associating the cross head position with the movable mold position in the embodiment shown in FIGS. 1 and 2 will be described hereinafter in detail with reference to FIGS. 3 to 5.

First, it is assumed that the link mechanism or the toggle mechanism 15 is extended, and the movable mold 13 is in a position shown in the upper half of FIG. 1 above the central axis 10. In this case, in the memory table 36 of FIG. 3, the position of the movable mold 13 is $X_0=0$, and the corresponding position of the cross head 17 is also $d_0=0$.

For example, when the position of the cross head 17 is 8 mm, $d_1=8$ is obtained from the memory table 36. Therefore, as the position of the movable mold 13, $X_1=0.002$ mm is obtained.

On the other hand, when the position of the cross head 17 is D=12 mm, a value is between $d_1=8$ mm and $d_2=16$ mm in the memory table 36. Therefore, as the corresponding position of the movable mold 13, the value should be determined between $X_1=0.002$ mm and $X_2=0.021$ mm.

In this manner, the position of the movable mold 13 is not stored in the memory table 36 and should be obtained corresponding to the position of the cross head 17 by interpolation calculation.

An operation will be described hereinafter with reference to FIG. 4.

FIG. 4 shows a processing flow for obtaining the position of the movable mold 13 by converting the position of the cross head 17. In a first step S1, i=0 is set.

The processing flow shifts to step S2, and cross head position D=12 mm is compared with $d_0=0$. Here, $D>d_i$, the flow therefore shifts to processing step S3, i is incremented by 1, and $d_i$ turns to $d_1$.

The value (=8 mm) of $d_1$ is read from the correspondence table 36, and compared with D=12 mm again in the step S2.

Here, still $D>d_1$, therefore in step S3 i is further incremented by 1, $d_i=d_2$ is obtained, and the value is compared with D=12 mm again in the step S2.

Since the value of $d_2$ is 16 mm, $D<d_i$ stands in the step S2, and the processing advances to step S4.

In the step S4, two cross head positions $d_1=8$ mm and $d_2=16$ mm, corresponding cross head positions $X_1=0.002$ mm and $X_2=0.021$ mm, and cross head position D=12 mm are used to calculate a movable mold position X corresponding to D=12 mm.

$$X = ((X_i - X_{i-1}) \times D + d_i \times X_{i-1} - d_{i-1} \times X_i)/(d_i - d_{i-1})$$
$$= ((0.021 - 0.002) \times 12 + 16 \times 0.002 - 8 \times 0.021)/(16 - 8)$$
$$= 0.0115$$

In this manner, the movable mold position X corresponding to the cross head position D not stored in the memory table 36 can easily be calculated.

Moreover, the memory table 36 shown in FIG. 3 indicates the movable mold position corresponding to an equal-interval cross head position. Therefore, when the equal interval is E, and i=D/E+1 is used, the position can easily be calculated as shown in FIG. 5.

Additionally, the value not stored in the memory table 36 is obtained by interpolation calculation by equation (1), and therefore a conversion error is sometimes developed. However, when the number of data pieces of the memory table 36 is increased, the conversion error can be reduced.

Figure 6:
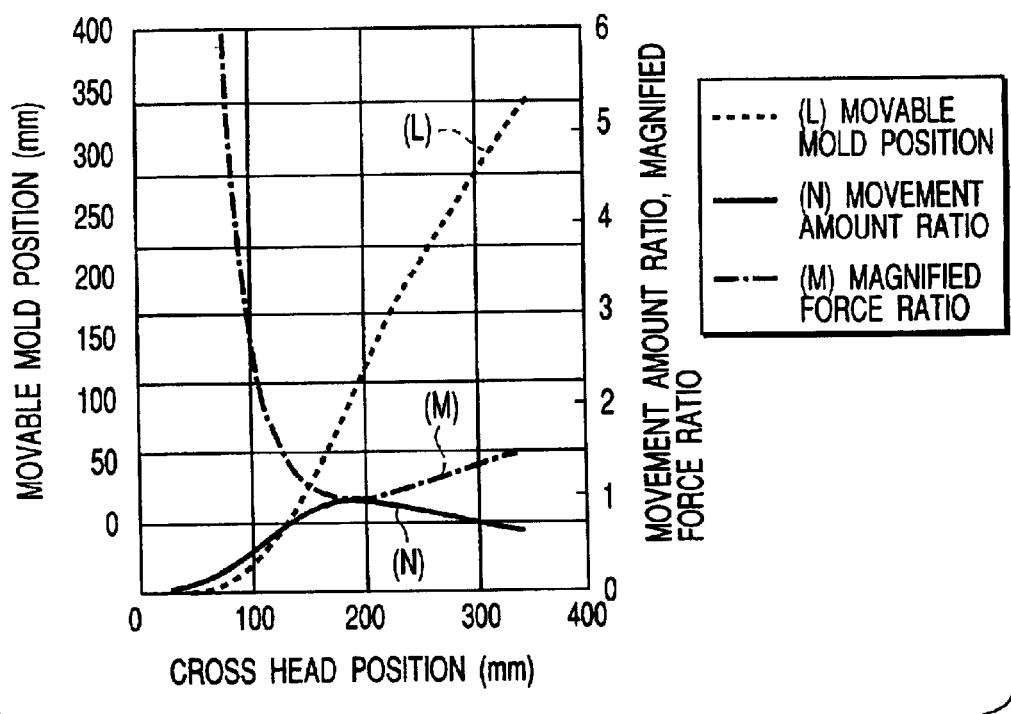
FIG. 6 is a curve showing a toggle property of a toggle mechanism in a relation between the movable mold position and the cross head position.

Here, a toggle property of the toggle mechanism 15 will be described with reference to FIG. 6. In FIG. 6, it is assumed that the cross head 17 moves backward from a forward limit position as a reference position by 400 mm at maximum, and the movable mold 13 also moves by 400 mm at maximum.

As seen from a curve (L) of FIG. 6, when the cross head 17 is positioned between position 0 and the vicinity of 50 mm, a magnified force ratio (M) is very large, and a movement amount of the movable mold 13 is nearly 0. It is seen that in a region of 50 mm to 200 mm, the magnified force ratio (M) of the toggle mechanism 15 decreases toward 1, the movement amount of the movable mold 13 increases with respect to a unit movement amount of the cross head 17, and a movement amount ratio (N) increases toward 1. At 200 mm the movement amount of the movable mold 13 is maximized. In this case, the magnified force ratio (M) indicates a minimum value of 1. Thereafter, the magnified force ratio (M) progressively increases, and the movement amount ratio (N) progressively decreases.

Since the movable mold 13 is driven by the cross head 17 via the toggle mechanism 15 having a toggle property shown in FIG. 6, the thrust force in each position of the movable mold 13 does not have a linear relation with the thrust force applied to the cross head 17. Therefore, the thrust force applied to the cross head 17 has to be controlled in order to set a necessary thrust force limit value to the movable mold 13.

Therefore, the movement amount of the movable mold 13 is obtained from the memory table 36 with respect to an equal-interval unit movement amount of the cross head 17. The thrust force to the movable mold 13 has to be limited so that the thrust force in the cross head position with the movement amount maximized therein indicates a thrust force limit value of the movable mold 13 to be protected.

For example, it is assumed that if there is no foreign substance between the movable and fixed molds 13 and 11, the movable mold 13 can be contacted to the fixed mold 11 at a certain moving speed with 5% of the thrust force of a driving source or the servomotor 30. On the other hand, when there is a foreign substance, a 70% thrust force will be required for moving the movable mold 13 at the same moving speed. In this case, the movable mold 13 will be contacted to the fixed mold 11 with the 70% thrust force, but there is a possibility that the molds 11 and 13 are broken due to the presence of the foreign substance.

Therefore, in the present embodiment, the movable mold 13 is moved forward by a set mold protecting force or less, and the cross head 17 is moved forward at a thrust force upper limit or less in accordance with the position of the movable mold 13. Moreover, the thrust force of the movable mold 13 is limited in order to prevent the molds 11, 13 from being broken. For example, when the limit value of the thrust force is set to 10%, only the 10% thrust force is applied to the mold 13 which is able to move by the 70% thrust force. Therefore, while the 10% thrust force is applied, the movable mold 13 stops, and the mold breakage can be prevented beforehand. When the mold 13 stops in this manner, an operator checks presence/absence of the foreign substance, removes it if any, and can continue an injection molding operation. In this case, only a thrust force much smaller than the force causing the mold breakage can be applied to the movable mold 13, and there is no possibility that the mold 11 and/or the mold 13 is broken. The operator has no risk of being hurt by a broken piece of the molds.

During actual operation, for the thrust force in the cross head position of 0 mm, a thrust force B for canceling a mechanically stationary friction is necessary. Therefore, unless more thrust force is applied to the cross head 17, the mold cannot be closed. Moreover, as shown in FIG. 6, when the cross head thrust force is limited in accordance with the movement amount ratio (N) of the movable mold 13 with respect to the cross head movement amount, the thrust force of the movable mold 13 can be held to be constant. That is, the thrust force of the cross head 17 is limited so that the thrust force in the cross head position with the movement amount of the movable mold 13 maximized therein indicates a thrust force A of the movable mold 13 to be protected.

Therefore, since the thrust force of the movable mold 13 is inversely proportional to the movement amount ratio (N) of the movable mold 13 with respect to the movement amount of the cross head 17 excluding the vicinity of the position of 0 mm, a limit value F of a cross head forward thrust force in a mold protection area is represented by:

$$F=B+(A-B)\times \text{movement amount/maximum movement amount.}$$

A value obtained by this calculation is supplied to the cross head position controller 33 from the cross head forward movement thrust force limit value calculator 34, and the thrust force of the cross head 17 is controlled.

Additionally, the movement amount/maximum movement amount is a ratio of the movement amount of the movable mold 13 to the movement amount of the cross head 17, and the ratio of the movable mold movement amount to the cross head movement amount in each cross head position can be calculated from the memory table of FIG. 3.

For example, when the cross head position is $d_1=8$ mm, the movement amount of the movable mold is:

$$X_1(0.002 \text{ mm})-X_0(0 \text{ mm})=0.002 \text{ mm}.$$

When the cross head position is $d_{25}=200$ mm, the maximum movement amount is:

$$X_{25}(152.151 \text{ mm})-X_{24}(138.486 \text{ mm})=13.665 \text{ mm}.$$

Therefore, when the cross head position is $d_1=8$ mm, the movement amount ratio of the movable mold 13 is 0.002/13.665.

Additionally, the movement amount ratio in the position whose position data is not stored in the memory table 36 among the equal-interval cross head positions shown in the memory table 36 can easily be obtained by interpolation calculation.

When the cross head position is D, the movement amount ratio Y of the movable mold is obtained by the following equation:

$$Y=((D-d_{i-1})\times ((X_i+X_{i-2}-2X_{i-1})/(d_i-d_{i-1})+X_{i-1}-X_{i-2})/(X_{maxi}-X_{maxi-1})$$

Where i is obtained similarly as in the aforementioned movable mold position calculation processing. Moreover, maxi denotes i of the movable mold position for the maximum movement amount.

Figure 7:
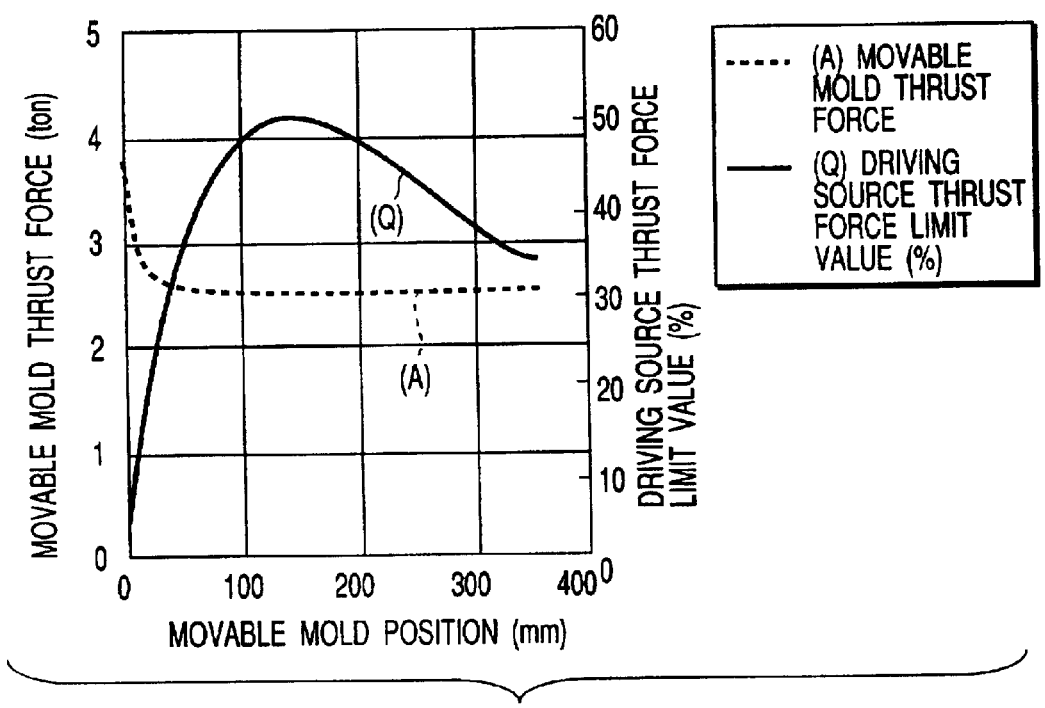
FIG. 7 is a curve showing a thrust force property of the movable mold in a relation between the movable mold position and the cross head position.

FIG. 7 shows one example of a thrust force property of the movable mold 13. As shown in a curve (A) of FIG. 7, the thrust force of the movable mold 13 indicates a large value in the vicinity of the position of 0, but is held to be constant substantially at 2.5 tons excluding the vicinity of 0. Additionally, in this case, as shown in a curve (Q), the thrust force limit value of the servomotor 30 as a driving source for driving the cross head 17 slightly exceeds 50% at maximum, and is mostly in a range of 40% to 50%.

The thrust force limit value of the driving source progressively increases to 50% from nearly 40% in a movable mold position range of 400 mm to 150 mm, but rapidly decreases in the position of 150 mm or less, and progressively decreases to 40% or less from 50%. In this case, the thrust force of the movable mold 13 is held to be constant at about 2.5 tons.

Additionally, in the memory table 36, in addition to the relation of the movable mold position to the cross head position, the movement amount ratio, magnified force ratio, and thrust force of the movable mold 13 may also be stored in accordance with the cross head 17. In this case, for example, the movement amount ratio of the movable mold 13 is directly read without being calculated, and calculation of the cross head forward movement thrust force limit value calculator 34 is therefore facilitated.

An operation of the present embodiment will be described hereinafter in detail by means of concrete numeric values.

For example, when the force of the cross head driving source is 100%, the thrust force of the movable mold 13 in the movable mold position with the movement amount of the movable mold 13 maximized therein with respect to the equal-interval cross head movement amount is 5 tons. The force of the cross head driving source for canceling the mechanically stationary friction force in the cross head position of 0 mm is 2%. In this mold clamping apparatus, the maximum limit value of the thrust force for closing the movable mold 13 in the mold protection division is set to 2.5 tons. In this case, the mold protection area is set, for example, to about 100 mm in a range of 100 mm to 0 mm in a whole stroke of 400 mm.

Here, in order to protect the molds 11, 13, the force of the cross head driving source is limited to 2.5/5=0.5 (50%) in the movable mold position (200 mm in FIG. 6) in which the movement amount of the movable mold 13 is maximized with respect to the unit movement amount of the equal-interval cross head movement. Therefore, the forward thrust force of the cross head driving source may be limited by the following ratio in the cross head position obtained from the memory table 36 in accordance with the each position of the movable mold 13:

2%+(50%−2%)×movement amount/maximum movement amount. Concretely, the servomotor 30 is driven in accordance with this thrust force.

That is, the limiting ratio in the cross head position of 0 mm is:

$$2\%+(50\%-2\%)\times 0/13.665=2.000\%.$$

The ratio in the cross head position of 8 mm is:

$$2\%+(50\%-2\%)\times 0.002/13.665=2.007\%.$$

The ratio in the cross head position of 120 mm is:

$$2\%+(50\%-2\%)\times 7.251/13.665=27.470\%.$$

The limiting ratio in the cross head position (i.e., the movable mold position in which the movement amount is maximized) of 200 mm is:

$$2\%+(50\%-2\%)\times13.665/13.665=50.000\%.$$

The limiting ratio in the cross head position of 320 mm is:

$$2\%+(50\%-2\%)\times9.588/13.665=35.679\%.$$

Additionally, for example, a timer 38 as shown in FIG. 1 may be disposed in the cross head forward movement thrust force limit value calculator 34, so that an operation time from when the movable mold 13 enters the mold protection area until the mold 13 reaches a mold clamping start position is limited. When the movable mold 13 does not reach the mold clamping start position in a time set on the timer 38, it is judged that a foreign substance is stuck between the molds 11 and 13. In this case, mold protection warning is outputted from the calculator 34, the operation of the calculator 34 is stopped, and the mold clamping operation can thus be stopped.

Moreover, the limit value of the thrust force in a direction in which the movable mold 13 is disconnected from the fixed mold 11, that is, on a backward side may be a maximum value of the thrust force of the driving source. For example, assuming that the thrust force for moving an object in a certain direction is a plus (+) force, a minus (−) force is necessary as the thrust force for moving the object in a reverse direction. The object of the present invention is to protect the molds even if a foreign substance is stuck between the movable mold 13 and the fixed mold 11 by preventing the movable mold 13 from being further moved forward and attached to the fixed mold 11. Thus, the molds are protected from breakage by limiting the forward thrust force to a protective thrust force.

Therefore, the thrust force for moving the movable mold 13 in a direction reverse to the direction in which the movable mold 13 is attached to the fixed mold 11 does not have to be limited, and can be set to a maximum value in consideration of controllability. Thereby, a maximum effect that an operation time is reduced by quickly returning the movable mold to an initial state can be obtained.

Figure 8:
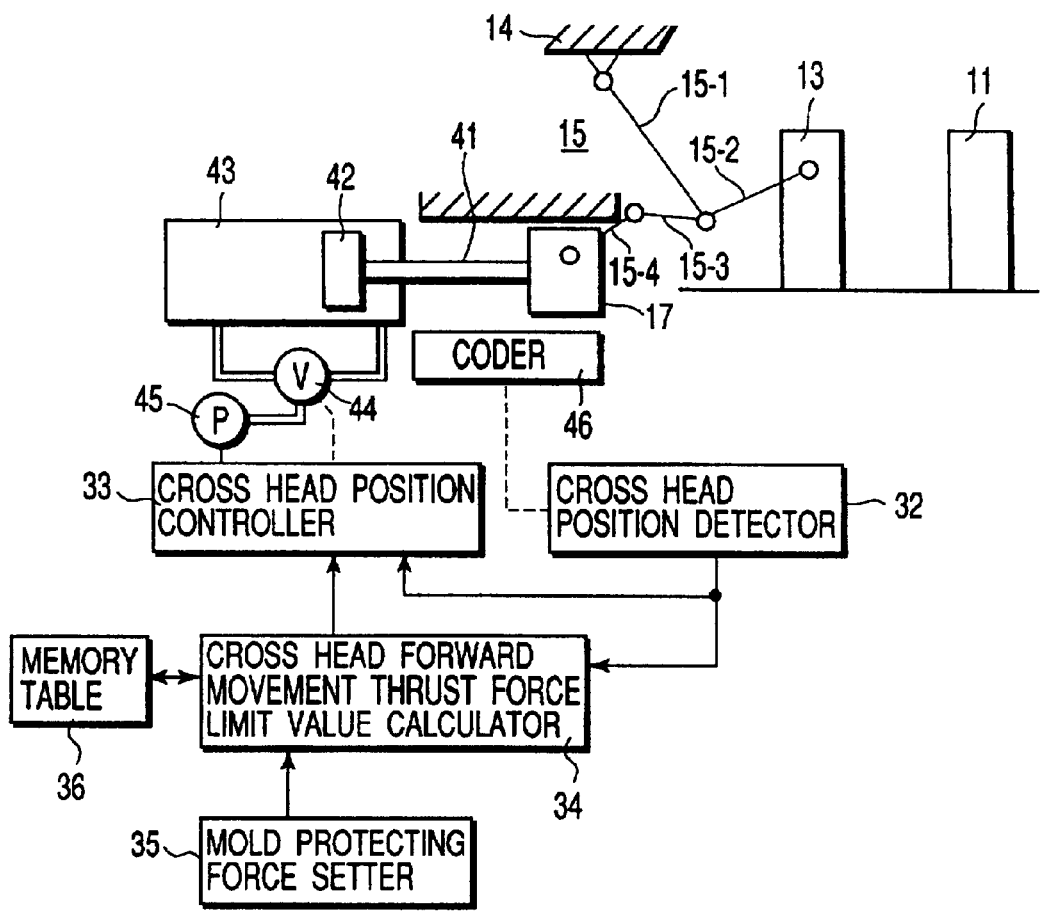
FIG. 8 is a block diagram showing a whole constitution of another embodiment of the present invention.

FIG. 8 shows another embodiment of the present invention in which a hydraulic mechanism is used. In FIG. 8, elements similar to those shown in FIG. 2 are denoted by the same reference numerals and detailed explanation thereof may be omitted. In FIG. 8, the cross head 17 is connected to a piston rod 41 which is connected to a piston 42 provided in a hydraulic cylinder 43. The flowing direction of the fluid in the cylinder 43 is controlled by a pump 45 through a valve 44. The operations of the valve 44 and pump 45 are controlled by the cross head position controller 33. The position of the cross head 17 is converted into an electric signal by means of a coder 46 positioned along the moving path of the cross head 17. The electric signal is supplied from the coder 46 to the cross head position detector 32. According to the hydraulic mechanism shown in FIG. 8, the cross head 17 may be driven in the similar manner as in the case of FIG. 2 and the detailed explanation thereof may be omitted here.

As described above in detail, according to the present invention, there can be provided a mold protection apparatus of an injection molding machine in which the thrust force limit value in each position of the movable mold can easily be obtained without any complicated calculation, and a safe thrust force can easily and quickly be set with respect to the movable mold during the mold clamping operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for protecting molds in an injection molding machine, comprising:

a cross head;

a driving apparatus for driving the cross head;

a movable mold connected to said cross head via a link mechanism; and a controller for controlling a forward thrust force of said movable mold when said movable mold is brought in contact with a fixed mold and the movable and fixed molds are closed, wherein said controller comprises:

a memory table in which a correspondence table showing a relation between just a cross head position and a movable mold operation is stored beforehand; and a driving control unit which controls driving of said cross head by said driving apparatus so that said movable mold moves with a thrust force preset to a mold protecting force or less in accordance with the operation of the movable mold in a mold protection area of said movable mold; and wherein a limit value of a minus thrust force on a backward side during deceleration of said cross head during mold closing until said movable mold contacts said fixed mold indicates a maximum driving force of said cross head.

2. The apparatus according to claim 1, wherein said driving unit comprises:

a mold protecting force setter for setting the mold protecting force for mold protection;

a calculator for calculating a movement thrust force limit value of said cross head based on the mold protecting force set by the mold protection force setter; and a controller for controlling the thrust force of said cross head based on the movement thrust force limit value obtained by the calculator.

3. The apparatus according to claim 1, wherein said driving unit comprises a servomotor for driving said cross head.

4. The apparatus according to claim 1, wherein said driving unit comprises a hydraulic mechanism for driving said cross head.

5. The apparatus according to claim 1, wherein said driving unit comprises a timer for setting a predetermined limit time to an operation time for which said cross head is in the mold protection area, and issues a mold protection warning or simultaneously stops the driving of the cross head, when said cross head enters the mold protection area but does not reach a mold clamping start position within said limit time.

* * * * *